United States Patent
Elahmadi et al.

(10) Patent No.: US 9,729,947 B2
(45) Date of Patent: Aug. 8, 2017

(54) PLUGGABLE OPTICAL TRANSCEIVER PROVIDING WAVELENGTH TUNING INFORMATION

(71) Applicants: Siraj Nour Elahmadi, Dallas, TX (US); Qingzhong Cai, Dallas, TX (US); Fredrick Muya, The Colony, TX (US); Paul Tuok, King of Prussia, PA (US); Salam Elahmadi, Dallas, TX (US)

(72) Inventors: Siraj Nour Elahmadi, Dallas, TX (US); Qingzhong Cai, Dallas, TX (US); Fredrick Muya, The Colony, TX (US); Paul Tuok, King of Prussia, PA (US); Salam Elahmadi, Dallas, TX (US)

(73) Assignee: Menara Networks, Inc., Dallas, TX (US)

( * ) Notice: Subject to any disclaimer, the term of this patent is extended or adjusted under 35 U.S.C. 154(b) by 24 days.

(21) Appl. No.: 14/993,787

(22) Filed: Jan. 12, 2016

(65) Prior Publication Data
US 2017/0201812 A1  Jul. 13, 2017

(51) Int. Cl.
*H04J 14/00* (2006.01)
*H04Q 11/00* (2006.01)
*H04J 14/02* (2006.01)

(52) U.S. Cl.
CPC .......... *H04Q 11/0005* (2013.01); *H04J 14/02* (2013.01); *H04Q 2011/0018* (2013.01); *H04Q 2011/0073* (2013.01)

(58) Field of Classification Search
CPC .... H04B 10/40; H04B 10/506; G02B 6/4292; G02B 6/4284; G02B 6/4246; G02B 6/4261; G02B 6/428; H04J 14/02
USPC .......................................................... 398/49
See application file for complete search history.

(56) References Cited

U.S. PATENT DOCUMENTS

| | | | |
|---|---|---|---|
| 7,580,637 B2 | 8/2009 | El-Ahmadi et al. | |
| 8,107,820 B2 | 1/2012 | Hotchkiss et al. | |
| 8,412,051 B2 | 4/2013 | El-Ahmadi et al. | |
| 8,929,744 B2 | 1/2015 | El-Ahmadi et al. | |
| 9,071,349 B2 | 6/2015 | El-Ahmadi et al. | |
| 9,071,361 B2 | 6/2015 | Ding et al. | |
| 2011/0229129 A1* | 9/2011 | Hu | H04B 10/40 398/34 |
| 2015/0071649 A1* | 3/2015 | Lee | H04B 10/40 398/135 |
| 2015/0200729 A1* | 7/2015 | Seo | H04B 10/40 398/79 |

(Continued)

OTHER PUBLICATIONS

SFF Committee; SFF-8472; Specification for Diagnostic Monitoring Interface for Optical Transceivers; Rev 12.2; Nov. 21, 2014.

(Continued)

*Primary Examiner* — Don N Vo
(74) *Attorney, Agent, or Firm* — Clements Bernard Walker PLLC; Lawrence A. Baratta, Jr.; Christopher L. Bernard

(57) ABSTRACT

Systems and methods for conveying wavelength tuning information from a pluggable optical transceiver to a host device determining the wavelength tuning information of the pluggable optical transceiver operating in the host device; appending the wavelength tuning information as part of existing data communicated between the pluggable optical transceiver and the host device; and providing the existing data with the wavelength tuning information incorporated therewith to the host device.

20 Claims, 8 Drawing Sheets

(56) References Cited

U.S. PATENT DOCUMENTS

2015/0244469 A1* 8/2015 Murayama ............ H04B 10/691
                                                                         398/34

OTHER PUBLICATIONS

SFF Committee; INF-8077i; 10 Gigabit Small Form Factor Pluggable Module; Revision 4.5; Aug. 31, 2005.

* cited by examiner

PLUGGABLE OPTICAL TRANSCEIVER PROVIDING WAVELENGTH TUNING INFORMATION

FIELD OF THE DISCLOSURE

The present disclosure generally relates to optical networking systems and methods. More particularly, the present disclosure relates to a pluggable optical transceiver providing wavelength tuning information.

BACKGROUND OF THE DISCLOSURE

Optical transceivers can be defined by multi-source agreements (MSAs) or equivalents, and can be referred to variously as pluggable transceivers, optical transceivers, pluggable optical transceivers, pluggables, transceivers, etc. MSAs are agreements for specifications of optical transceivers agreed to by multiple vendors, organizations, etc. and promulgated for other vendors and network operators to utilize. MSAs allow other vendors to design transceivers to the same specifications reducing risk for vendors and operators, increasing flexibility, and accelerating the introduction of new technology. Exemplary MSAs include XFP, XPAK, XENPAK, X2, XFP-E, SFP, SFP+, and 300-pin. Exemplary MSAs for 40 G, 100 G, 200 G, and 400 G include CFP and variants thereof (e.g., CFP2, CFP4, CXP), CDFP and variants thereof (e.g., CDFP2, CDFP4, etc.), OIF-MSA-100GLH-EM-01.0—Multisource Agreement for 100 G Long-Haul DWDM Transmission Module-Electromechanical (June 2010) (hereinafter MSA-100GLH), CCRx (Compact Coherent Receiver), Quad Small Form-factor Pluggable (QSFP) and variants thereof (e.g., future QSFP+, QSFP2), 10×10 MSA, and the like. Additionally, new MSAs are emerging to address new services, applications, and advanced technology. Each MSA defines the transceiver's mechanical characteristics, management interfaces, electrical characteristics, optical characteristics, and thermal requirements. Because of MSA specifications, MSA-compliant optical transceivers are standardized among equipment vendors and network operators to support multiple sources for optical transceivers and interoperability. As such, MSA-compliant optical transceivers have become the dominant form of optical transmitters and receivers in the industry finding widespread acceptance over proprietary implementations.

Advantageously, MSA-compliant optical transceivers ensure engineering re-use and compatibility between various applications and the physical media dependent (PMD) transceivers. Further, equipment vendors realize streamlined manufacturing and inventory control by removing wavelength specific decisions from the manufacturing process. For example, all line cards are manufactured the same, and the optical transceiver module with the desired wavelength (e.g. 850 nm, 1310 nm, 1550 nm, coarse wave division multiplexed (CWDM), dense wave division multiplexed (DWDM), etc.) is plugged in as a function of the specific application or development configuration. Network operators and service providers have adopted optical transceivers to reduce sparing costs. Further, significant cost reductions are realized by MSA standardization of optical transceivers because of multiple independent manufacturing sources. The MSA specifications tightly define the mechanical characteristics, management interfaces, electrical characteristics, optical characteristics, and thermal requirements of optical transceivers. Advantageously, this enables interoperability among equipment vendors of optical transceivers, i.e. any MSA-compatible optical transceiver can be used in any host device designed to the MSA specification; however, these tightly defined characteristics limit the performance of optical transceivers since the MSA specifications were designed to maximize density and minimize cost, and not to provide advanced optical performance or other integrated functions.

The MSA-compliant optical transceivers are adapted to operate in host devices, such as switches, routers, Multi-Service Provisioning Platforms (MSPPs), optical cross-connects, etc. Optical transceivers are also evolving to support wavelength tuning to allow the transmission wavelength to tune to various different wavelengths for CWDM, WDM, and/or DWDM applications. Disadvantageously, existing MSAs, such as SFP and XFP, do not support wavelength tuning. There exists a need to support wavelength tuning with existing MSAs, which do not support wavelength tuning and in a manner that supports host compatibility with the existing MSAs.

BRIEF SUMMARY OF THE DISCLOSURE

In an exemplary embodiment, a method for conveying wavelength tuning information from a pluggable optical transceiver to a host device includes determining the wavelength tuning information of the pluggable optical transceiver operating in the host device; appending the wavelength tuning information as part of existing data communicated between the pluggable optical transceiver and the host device; and providing the existing data with the wavelength tuning information incorporated therewith to the host device.

In another exemplary embodiment, a pluggable optical transceiver adapted to convey wavelength tuning information to a host device includes a transmitter adapted for wavelength tuning to a wavelength and a receiver; a communication interface communicatively coupled to the host device; and processing circuitry adapted to i) determine the wavelength tuning information based on the wavelength while operation in the host device, ii) append the wavelength tuning information as part of existing data provided via the communication interface, and iii) provide the existing data with the wavelength tuning information incorporated therewith via the communication interface.

In a further exemplary embodiment, a host device adapted to operate a pluggable optical transceiver and to receive wavelength tuning information therefrom includes one or more interfaces adapted to receive the pluggable optical transceiver; and a communication interface communicatively coupled to the pluggable optical transceiver when installed in the one or more interfaces; wherein the host device does not support diagnostics over the communication interface for the wavelength tuning information, and wherein the wavelength tuning information is communicated to the host device via the communication interface appended to existing data already provided over the communication interface.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to a pluggable optical transceiver providing wavelength tuning information, such as to host devices that do not support wavelength tuning in associated pluggable optical transceivers. In an exemplary embodiment, the pluggable optical transceiver can be XFP or SFP; note, the XFP and SFP MSAs do not necessarily include wavelength tuning information between the host device and the pluggable optical transceiver. The wavelength tuning information can be provided using existing MSA diagnostic information. For example, the wavelength tuning information can be provided as part of the vendor part number field which is an American Standard Code for Information Interchange (ASCII) string. The present disclosure contemplates conveying a current wavelength on a wavelength tunable pluggable optical transceiver as part of the vendor part number field or some other existing field as specified in an MSA. As such, the present disclosure supports wavelength tuning information in MSAs that do not support such features.

Figure 1:
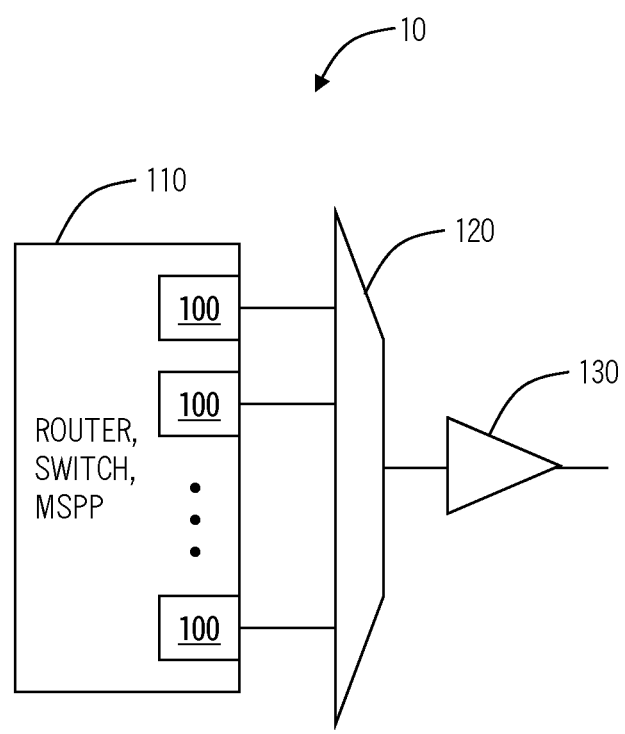
FIG. 1 is a block diagram illustrates a wavelength division multiplexed (WDM) system with one or more pluggable optical transceivers included in a host device.

Referring to FIG. 1, in an exemplary embodiment, a block diagram illustrates a wavelength division multiplexed (WDM) system 10 with one or more pluggable optical transceivers 100 included in a host device 110. The one or more pluggable optical transceivers 100 can be communicatively coupled to WDM multiplexers/demultiplexers 120 which can be communicatively coupled to an amplifier 130 for transmission. The host device 110 can include servers, routers, Ethernet switches, multiservice provisioning platforms (MSPPs), optical cross-connects, or any other device with requirements for optical transmission. The pluggable optical transceivers 100 are compatible with an MSA, such as XFP, SFP, XENPAK, etc., and the pluggable optical transceivers 100 support wavelength tuning of operating wavelength. The wavelength tuning can be any wavelength between 1528 to 1565 nm. In an exemplary embodiment, the wavelength tuning can be based on the wavelength grids defined in ITU-T G.694.1 (February 2012) "Spectral grids for WDM applications: DWDM frequency grid" or ITU-T G.694.2 (December 2003) "Spectral grids for WDM applications: CWDM wavelength grid," the contents of each is incorporated by reference. In ITU-T G.694.1, the grid is defined relative to 193.1 THz and extends from 191.7 THz to 196.1 THz with 100 GHz spacing. While defined in frequency, the grid is often expressed in terms of wavelength, in which case it covers the wavelength range of 1528.77 nm to 1563.86 nm with approximately a 0.8 nm channel spacing. For practical purposes, the grid has been extended to cover 186 THz to 201 THz and subdivided to provide 50 GHz and 25 GHz spaced grid. Of course, other values of wavelength tuning are also contemplated.

The host device 110 can be any device adapted to operate the pluggable optical transceivers 100, but does not support wavelength tuning diagnostics. Specifically, the pluggable optical transceivers 100 and the host device 110 are compliant to an MSA that does not specific wavelength tuning diagnostics. The pluggable optical transceivers 100 are designed to specifications such that they can be installed in any device 110 designed to host a pluggable optical transceiver 100. These specifications allow the design of the host device 110 to be decoupled from the design of the pluggable optical transceivers 100. Alternatively, the pluggable optical transceivers 100 can also be used for single wavelength applications, i.e. non-WDM transmission. Having WDM and wavelength tunability in the pluggable optical transceivers 100 can avoid the use of an external transponder between the pluggable optical transceivers 100 and the WDM multiplexers/demultiplexers 120.

FIG. 1 illustrates the host device 110 equipped with pluggable optical transceivers 100 where the pluggable optical transceivers 100 are designed to support native optical line rates such as 9.96 Gbps for SONET OC-192 and SDH STM-64, 10.3 Gbps for GbE LAN PHY, 10.5 Gbps for 10 G Fiber Channel, and the like. The pluggable optical transceivers 100 are configured to accept an electrical signal and to convert it into an optical signal for transmission to the WDM multiplexers/demultiplexers 120.

Figure 2:
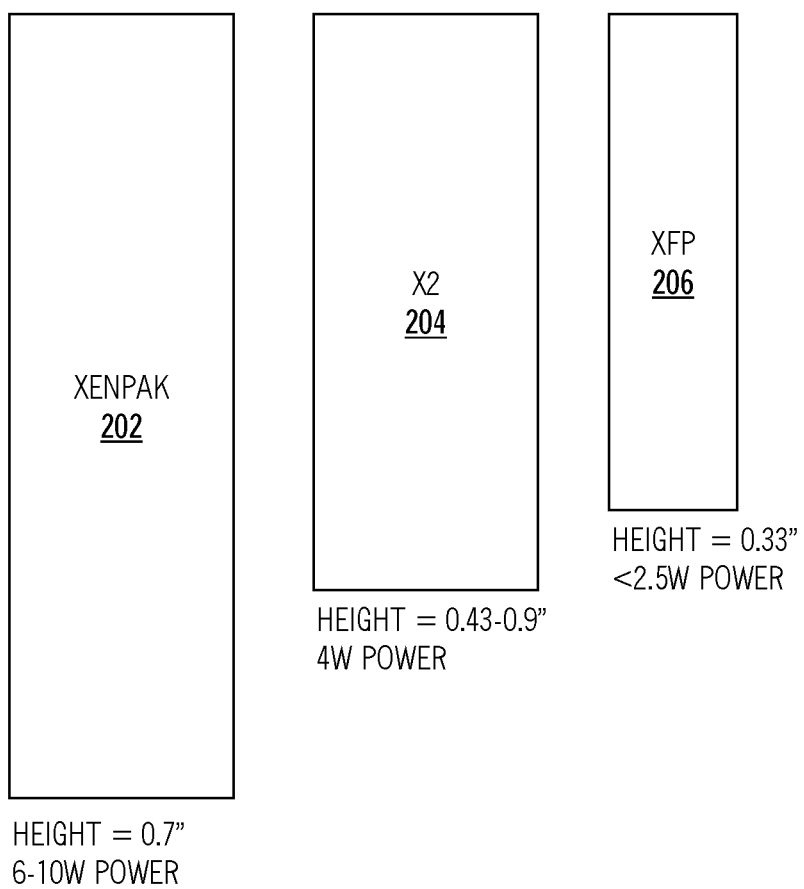
FIG. 2 is a block diagram of several MSA specifications including, for example, XENPAK, X2, and XFP.

Referring to FIG. 2, in an exemplary embodiment, several MSA specifications currently exist for optical transceivers including, for example, XENPAK 202, X2 204, and XFP 206. The optical MSAs were developed with the intent to maximize port density; hence the power and footprint constraints. The XFP MSA, for example, states that the XFP transceiver must accept data input up to 11.1 Gbps FEC rate but not that the functions must be carried out inside the XFP due to the limited space and power available inside the XFP. The XENPAK 202 MSA supports the proposed 802.3ae IEEE 10 Gigabit Ethernet (10 GbE) standard and specifies a uniform form factor, size, connector type and electrical pin-outs. XENPAK 202 simplifies management of architecture shifts and integration, minimizes system costs, ensures multiple vendors for market supply, and guarantees thermal performance for high density 10 GbE ports. XENPAK 202 requires power dissipation of no more than 6 W for 1310 nm and 850 nm wavelengths and power dissipation of no more than 10 W for 1550 nm wavelengths. The XENPAK 202 MSA is available at www.xenpak.org/MSA.asp and is hereby incorporated by reference.

The X2 204 MSA defines a small form-factor 10 Gbps optical fiber optic transceiver optimized for 802.3ae Ethernet, ANSI/ITUT OC192/STM-64 SONET/SDH interfaces, ITU-T G.709, OIF OC192 VSR, INCITS/ANSI 10GFC (10 Gigabit Fiber Channel) and other 10 Gigabit applications. X2 204 is physically smaller than XENPAK 202 but maintains the same electrical I/O specification defined by the XENPAK 202 MSA and continues to provide robust thermal performance and electromagnetic shielding. X2 204 uses the same 70-pin electrical connectors as XENPAK 202 supporting four wire XAUI (10-gigabit attachment unit interface). X2 204 supports an input signal of G.709 but does not support framing a non-G.709 signal internal to the optical transceiver and also does not support FEC and optical layer OAM&P. The X2 204 MSA is available at www.x2msa.org/MSA.asp and is hereby incorporate by reference.

The XFP (10 Gigabit Small Form Factor Optical) 206 is a hot-swappable, protocol independent optical transceiver, typically operating at 1310 nm or 1550 nm, for 10 Gigabit SONET/SDH, Fiber Channel, Gigabit Ethernet and other applications. The XFP 206 MSA is available from www.xfpmsa.org and is hereby incorporated by reference. The XFP 206 MSA defines a specification for a module, cage hardware, and IC interfaces for a 10 Gbps hot optical module converting serial electrical signals to external serial optical or electrical signals. The technology is intended to be flexible enough to support bit rates between 9.95 Gbps and 11.1 Gbps for services such as OC-192/STM-64, 10 G Fiber Channel, G.709, and 10 G Ethernet. XFP 206 supports native G.709 signals. XFP-E (not shown in FIG. 2) is an extension of the XFP 206 MSA for ultra-long haul DWDM applications and tunable optical transmitters.

XPAK (not shown in FIG. 2) is a reduced-sized, optical 10 Gigabit Ethernet (GbE) module customized for enterprise, storage area network (SAN), and switching center market segment applications. The XPAK specifications define mechanical, thermal, and electromagnetic interference (EMI) mitigation features of the form factor, as well as reference 10-GbE optical and XENPAK 202 MSA electrical specifications. XPAK offers higher density and better power efficiency than XENPAK 202 and offers 10 GbE links up to 10 km and eventually 40 km. The SFP+(not shown in FIG. 2) MSA is a specification for an optical, hot-swappable optical interface for SONET/SDH, Fiber Channel, Gigabit Ethernet, and other applications. SFP+ is designed for up to 80 km reach and supports a full range of applications. SFP+ is similar in size and power with the XFP 206 specification and similarly accepts a serial electrical input.

Figure 3A:
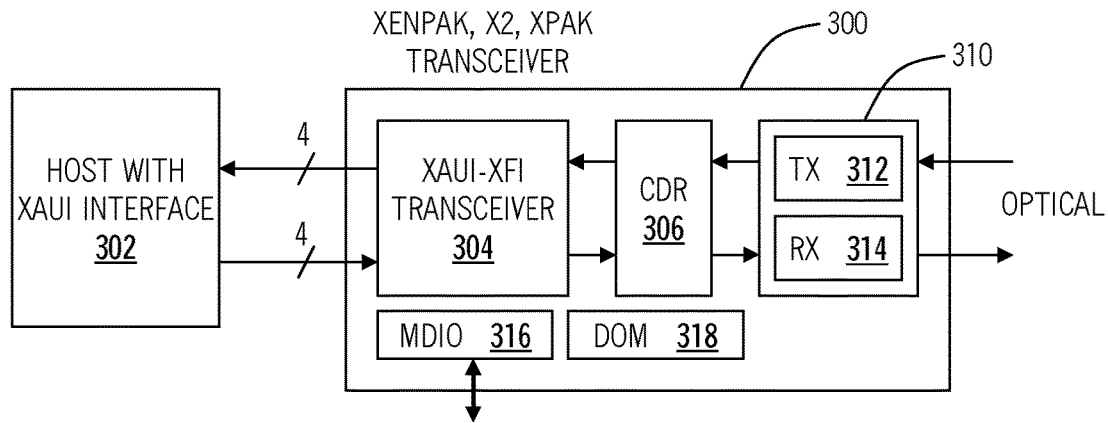
FIGS. 3a and 3b are block diagrams illustrate an XENPAK, XPAK, and X2 optical transceiver (FIG. 3a) and a XFP and XFP-E optical transceiver (FIG. 3b)
Figure 3B:
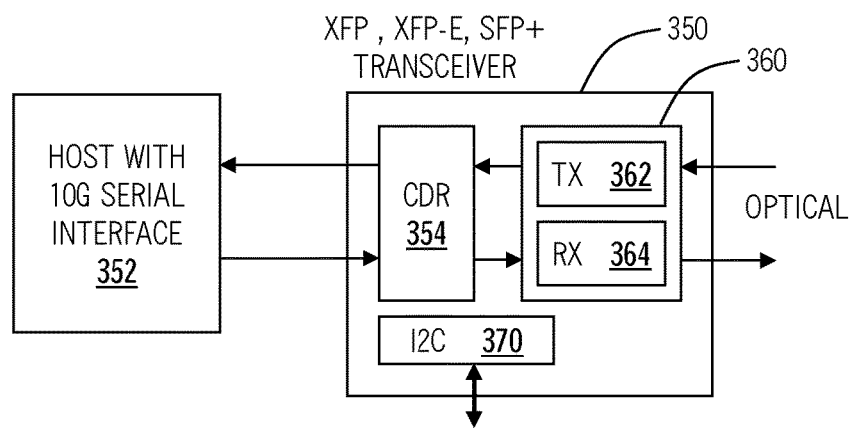

Referring to FIGS. 3a-3b, in exemplary embodiments, block diagrams illustrate an XENPAK, XPAK, and X2 optical transceiver 300 (FIG. 3a) and a XFP and XFP-E optical transceiver 350 (FIG. 3b). In FIG. 3a, the XENPAK, XPAK, and X2 optical transceiver 300 includes an optical module 310 connected to a clock and data recovery (CDR) 306 module which is connected to a XAUI-XFI transceiver 304. Typically, the CDR 306 can be integrated into the XAUI-XFI transceiver 304. The XAUI-XFI transceiver 304 is configured to connect to a host device with an XAUI interface 302. The host device includes a socket in which the optical transceiver 300 plugs into to connect to the host 302. XAUI is a 4×3.125 Gbps electrical connection compliant with the IEEE 802.3ae 10 GbE specification. XFI is a standard interface for connecting 10 Gig Ethernet MAC devices to an optical interface. The XAUI-XFI transceiver 304 includes multiplexer/demultiplexer functions and encoding/decoding functions to perform 8B/10B and 64B/66B coding. XAUI provides four lanes running at 3.125 Gbps using 8B/10B encoding, and XFI provides a single lane running at 10.3125 Gbps using 64B/66B encoding. Additionally, the XAUI-XFI transceiver 304 can include a SONET framer called a WAN Interface Sublayer (WIS).

The XAUI-XFI transceiver 304 accepts the XAUI signal and converts it into a serial connection such as a 10.3125 Gbps XFI signal for transmission by the optical module 310. The optical module 310 includes a transmitter (TX) 312 and a receiver (RX) 314. The TX/RX 312,314 can include 850 nm, 1310 nm, 1550 nm, DWDM, CWDM, and the like depending on the application requirements. The TX/RX 312,314 connect to the CDR 306 module where a clock is generated by retrieving the phase information of an input signal and retiming occurs on an output signal. In some embodiments, the functionality of the CDR 306 is included in the XAUI-XFI transceiver 304. While the optical transceiver 300 provides functionality to convert between XAUI and XFI, the transceiver 300 does not include integrated G.709 framing, OTN layer OAM&P (e.g., ITU-T G.798, G.826, G.8201, etc.), and FEC functionality.

Additionally, the optical transceiver 300 includes management data input/output (MDIO) 316 and digital optical monitoring (DOM) 318 for communications and performance monitoring between the transceiver 300 and the host 302. MDIO 316 is a standard-driven, dedicated-bus approach that is specified by IEEE workgroup 802.3. The MDIO 316 interface is implemented by two pins, an MDIO pin and a Management Data Clock (MDC) pin. The MDIO 316 interface is defined in relationship to the accessing and modification of various registers within physical-layer (PHY) devices, and how they relate to connecting to media access controllers (MACs) in 1- and 10-Gbit/s Ethernet solutions. One MDIO 316 interface can access up to 32 registers, in 32 different devices. A device driving an MDIO 316 bus is called a station management entity (STA), and the device being managed by the STA is called the MDIO Manageable Device (MMD). The STA drives the MDC line. It initiates a command using an MDIO frame and provides the target register address. During a write command, the STA also provides the data. In the case of a read command, the MMD takes over the bus and supplies the STA with the data. DOM 318 is an optical monitoring scheme utilized by each MSA specification for performance monitoring on the optical transceiver. For example, the DOM 318 can provide performance monitoring data such as optical output power, optical input power, laser bias current, etc. While DOM 318 provides some performance monitoring capabilities, it does not provide OTN OAM&P capable of operating carrier-grade networks. DOM 318 provides component level performance monitoring information, and DOM 318 does not provide optical link layer OAM&P.

In FIG. 3b, the XFP and XFP-E optical transceiver 350 include a clock and data recovery (CDR) 354 module configured to accept a serial input from a host with a 10 G serial interface 352. The CDR 354 module generates a clock by retrieving the phase information of an input signal and retiming occurs on an output signal. The CDR 354 module connects to an optical module 360 which includes a transmitter (TX) 362 and a receiver (RX) 364. The TX/RX 362,364 can include 850 nm, 1310 nm, 1550 nm, DWDM, CWDM, and the like depending on the application requirements. Additionally, the optical transceiver 350 includes an inter-integrated circuit (I2C) 370 serial bus. I2C is a serial communications bus through which an optical transceiver 350, such as XFP, XFP-E, SFP, and SFP+, communicates to the host device 110. The optical transceiver 350 provides no multiplexer/demultiplexer or encoding/decoding functionality and solely provides an electrical to optical conversion of a signal. Similar to the XENPAK, XPAK, and X2 optical transceiver 300, the XFP, XFP-E, and SFP+ optical transceiver 350 provides no G.709 framing, OAM&P, and FEC functionality. Note, existing SFP and SFP+ optical transceivers are different. SFP optical transceivers do not include the CDR 354 and the CDR 354 is located in the host.

Figure 4:
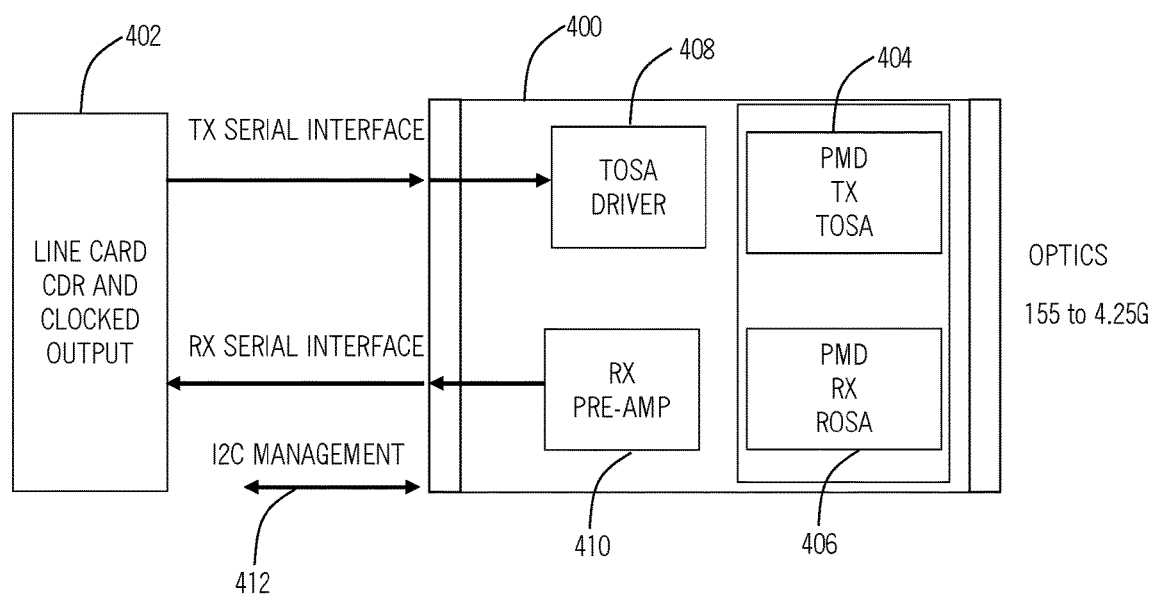
FIG. 4 is a block diagram of an SFP module.

Referring to FIG. 4, in an exemplary embodiment, a block diagram illustrates an SFP module 400. The SFP module 400 is a compact optical transceiver used in optical communications for both telecommunication and data communications applications. It interfaces a network device line card 402 (for a switch, router or similar device, i.e., the host device 110) to a fiber optic or unshielded twisted pair networking cable. The SFP module 400 is a popular industry format supported by several fiber optic component vendors. SFP modules 400 are designed to support SONET, Ethernet, Fibre Channel, and other communications standards.

The SFP modules 400 are available with a variety of different transmitter (Tx) 404 and receiver (Rx) 406 types, allowing users to select the appropriate transceiver for each link to provide the required optical reach over the available optical fiber type (e.g. multi-mode fiber or single-mode fiber). Optical SFP modules 400 are commonly available in four different categories: 850 nm (SX), 1310 nm (LX), 1550 nm (ZX), and DWDM. SFP transceivers are also available with a "copper" cable interface, allowing a host device designed primarily for optical fiber communications also to communicate over unshielded twisted pair networking cable. There are also CWDM and single-optic (1310/1490 nm upstream/downstream) SFPs. The different categories of SFP modules 400 are based on different PMD Tx Transmitter Optical Subassemblies (TOSA) 404 and PMD Rx Receiver Optical Subassemblies (ROSA) 406.

The SFP module 400 is specified by a multi-source agreement (MSA) between competing manufacturers. The SFP module 400 is commercially available with capability for data rates up to 4.25 Gbit/s or higher. The SFP module 400 supports digital optical monitoring (DOM) functions according to the industry-standard SFF-8472 Multi-Source Agreement (MSA) "Diagnostic Monitoring Interface for Optical Transceivers," the contents of which are incorporated by reference. This feature gives an end user the ability to monitor real-time parameters of the SFP, such as optical output power, optical input power, temperature, laser bias current, and transceiver supply voltage.

The SFP module 400 includes a TOSA driver 408 which is configured to interface to a Tx serial interface on the line card 402. The TOSA driver 408 provides the serial input to the PMD Tx TOSA 404. The PMD Rx ROSA 406 is configured to receive an optical signal and provide the received optical signal to a Rx pre-amp 410 which interfaces to a Rx serial interface on the line card 404. In conventional SFP modules 400, the line card 402 (or another host device) includes a CDR and clocked output, and this functionality is not included on the SFP module 400, i.e. the SFP module 400 does not include an internal reference clock. Additionally, the SFP module 400 includes an I2C management interface 412 which interfaces to the line card 402 to provide the DOM and other MSA-based communications. Note, in the SFP MSA, the I2C management interface 412 has limited functions.

Figure 5:
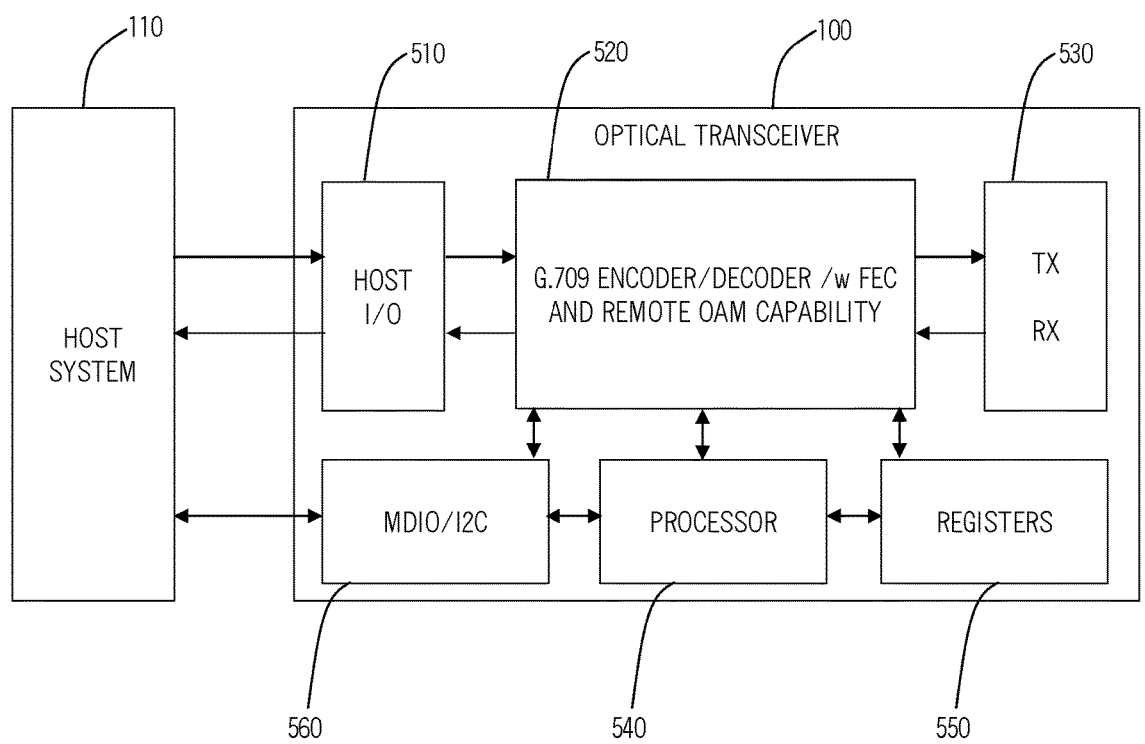
FIG. 5 is a block diagram of functionality of an optical transceiver.

Referring to FIG. 5, in an exemplary embodiment, a block diagram illustrates the functionality of an optical transceiver 100. The optical transceiver 100 can include any MSA-compatible optical transceiver, such as CFP and variants thereof (e.g., CFP2, CFP4, CXP), CDFP and variants thereof (e.g., CDFP2, CDFP4, etc.), MSA-100GLH, CCRx, QSFP and variants thereof (e.g., future QSFP+, QSFP2), 10×10, XFP, XPAK, XENPAK, X2, XFP-E, SFP, SFP+, 300-pin, and the like. As described herein, the present disclosure includes wavelength tuning diagnostics/information from the optical transceiver 100 to the host device 110 to enable users of the host device 110 to determine what wavelength is tuned on the optical transceiver 100, despite the host device 110 being unable to support such functionality. Accordingly, the optical transceiver 100 is configured to operate in any host device 110 configured to operate according to the MSA specifications.

The optical transceiver 100 includes a host input/output (I/O) module 510, an optional G.709 encoder/decoder 520, a Tx/Rx module 530, a processor 540, registers 550, and an MDIO/I2C interface 560. Note, the various modules 510-560 can be integrated within various ASICs on the optical transceiver 100. The host I/O module 510 is configured to interface with the host device 110 according to the MSA specifications. For example, the host device 110 can include a XAUI, serial interface, or the like. The G.709 encoder/decoder 520 is optional and can be configured to frame/un-frame, encode/decode FEC, and process overhead integrated within the optical transceiver 100 while preserving the MSA specifications. The Tx/Rx module 530 provides the physical optical input/output.

The optical transceiver 100 includes a processor 540 which is communicatively coupled to the G.709 encoder/decoder 520, multiple registers 550, and an MDIO/I2C interface 560. The processor 540 is a hardware device for executing software instructions. The processor 540 can be any custom made or commercially available processor, a central processing unit (CPU), an auxiliary processor among several processors, a semiconductor-based microprocessor (in the form of a microchip or chip set), or generally any device for executing software instructions.

In an exemplary embodiment, the processor 540 is configured to process and provide performance monitoring (PM) data and alarming based on the overhead and FEC from the G.709 encoder/decoder 520. Additionally, the processor 540 is configured to export PM and alarm data off the optical transceiver 540 through the MDIO/I2C interface 560. For example, the processor 540 can be configured to bridge data on the MDIO/I2C interface 560 through the registers 550 in the MSA specification to provide an MSA-compliant mechanism to report the data to the host device 110.

The G.709 encoder/decoder 520 can be configured to transmit/receive a signal to/from the host I/O 510. The signal is decoded/encoded with FEC and de-framed/framed with overhead. The G.709 encoder/decoder 520 is configured to strip out incoming overhead, and process the overhead in conjunction with the processor 540. Advantageously, the integration of framing, FEC, and OAM&P into the MSA optical transceiver 100 enables performance monitoring and alarming at a carrier-grade level without extra equipment. This functionality is integrated into the optical transceiver 100 while preserving the existing MSA specifications. Accordingly, the optical transceiver 100 can operate in any MSA-compliant host device 110. The host device 110 can be configured to retrieve PMs and alarms from the optical transceiver 100 through software modifications only, i.e. to read the registers used for this data.

The optical transceiver 100 can operate in a transparent mode and an enhanced mode. In the transparent mode, the module can be used with existing host device 110 driver software without any alteration. In this mode, the OTN framing and Forward Error Correction features are always turned on but all associated Overhead Management information is terminated within the optical transceiver 100 and is transparent to the host device 110 driver software. The optical transceiver 100 can be built with the necessary intelligence to recognize the 10GE PHY mode (LAN PHY or WAN PHY) the host device 110 wants to configure, by monitoring register "2.7.0" PCS Type Selection, and sets all appropriate OTN frame registers, VCXO frequencies, etc. . . . to accommodate the proper OTN bit rate for the mode selected. In the Transparent Mode, the optical transceiver 100 offers 4× higher DWDM performance and enhanced reach thanks to the Forward Error Correction coding gain feature.

In the Enhanced mode, in addition to selecting a LAN or WAN PHY, the host can also turn on and off the OTN and FEC features. In this mode, the host has full accessibility to all the OTN G.709 OAM features so that an ITU OTN compliant 10 Gbps optical interface can be supported and exposed to a higher layer software entity. Management data from and to the host is supported via the standard MDIO/I2C interface 560 (so no hardware change is necessary). Network operators can access various components of the overhead on the optical transceiver 100 through the host device 110 and the MDIO/I2C interface 560. The host device 110 can be configured to retrieve various PMs and alarm information from the registers 550 through the MDIO/I2C interface 560. This information can be imported through the host device 110 to an EMS system for access by network operators. The present disclosure contemplates access to all alarms in ITU-T G.709, all six Tandem Connection Monitoring (TCM) bytes in G.709, far end monitoring as specified in G.709, loopbacks, historical and real-time PM values for FEC, section, and path, and the like.

Figure 6:
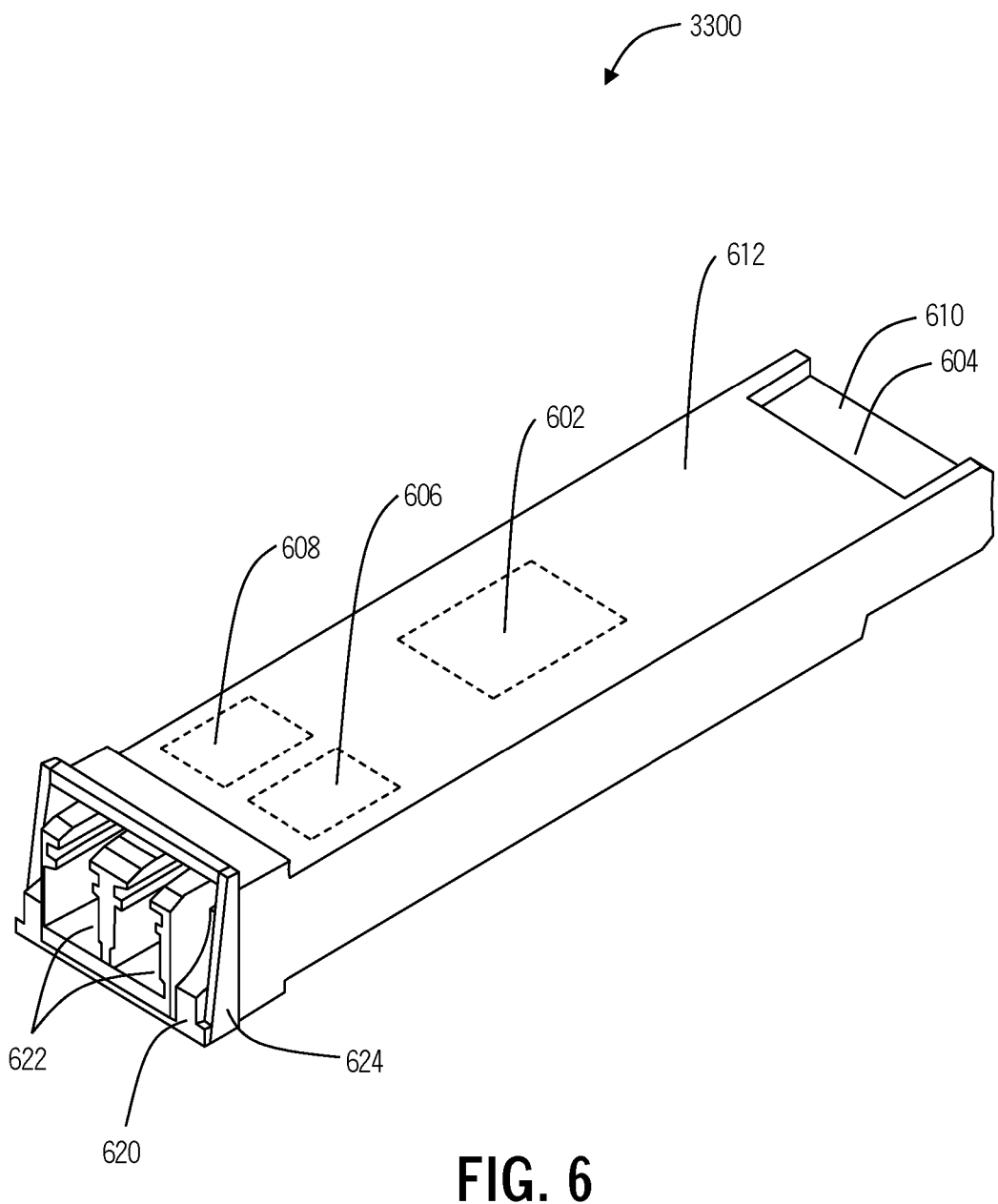
FIG. 6 is a perspective diagram of the optical transceiver of FIG. 5.

Referring to FIG. 6, in an exemplary embodiment, a perspective diagram illustrates the optical transceiver 100. The optical transceiver 100 includes integrated circuitry 602 mounted therein to a printed circuit board 604 that incorporates embodiments of the disclosure. The integrated circuitry 602 may be circuitry such as one or more application-specific integrated circuits (ASICs) to support both the components in the optical transceiver 100. The integrated circuitry 602 can be configured to provide the functionality described herein with regard to the present disclosure. The optical transceiver 100 further includes a transmitter 606 (i.e., an EO converter) and a receiver 608 (i.e., an OE converter). The optical transceiver 100 can be compatible with CFP and variants thereof (e.g., CFP2, CFP4, CXP), CDFP and variants thereof (e.g., CDFP2, CDFP4, etc.), MSA-100GLH, CCRx, QSFP and variants thereof (e.g., future QSFP+, QSFP2), 10×10, XFP, 300-pin, XPAK, X2, XENPAK MSAs, and other proprietary or standard packages.

The printed circuit board 604 includes top and bottom pads (top pads illustrated) to form an edge connection 610 to couple to a socket of a host device 110. A housing 612 couples around the printed circuit board 604 to protect and shield the integrated circuitry 602 and other components in the transceiver 100. Note, the housing 612 is typically defined in the MSA. A front fiber optic plug receptacle 620 is provided with openings 622 to interface with one or more fiber optic cables and their plugs. A mechanical latch/release mechanism 624 can be provided as part of the optical transceiver 100. While the optical transceiver 100 has been described has having both light transmission and light reception capability, it may be a fiber optic transmitter module with light transmission only or a fiber optic receiver module with light reception only.

Figure 7:
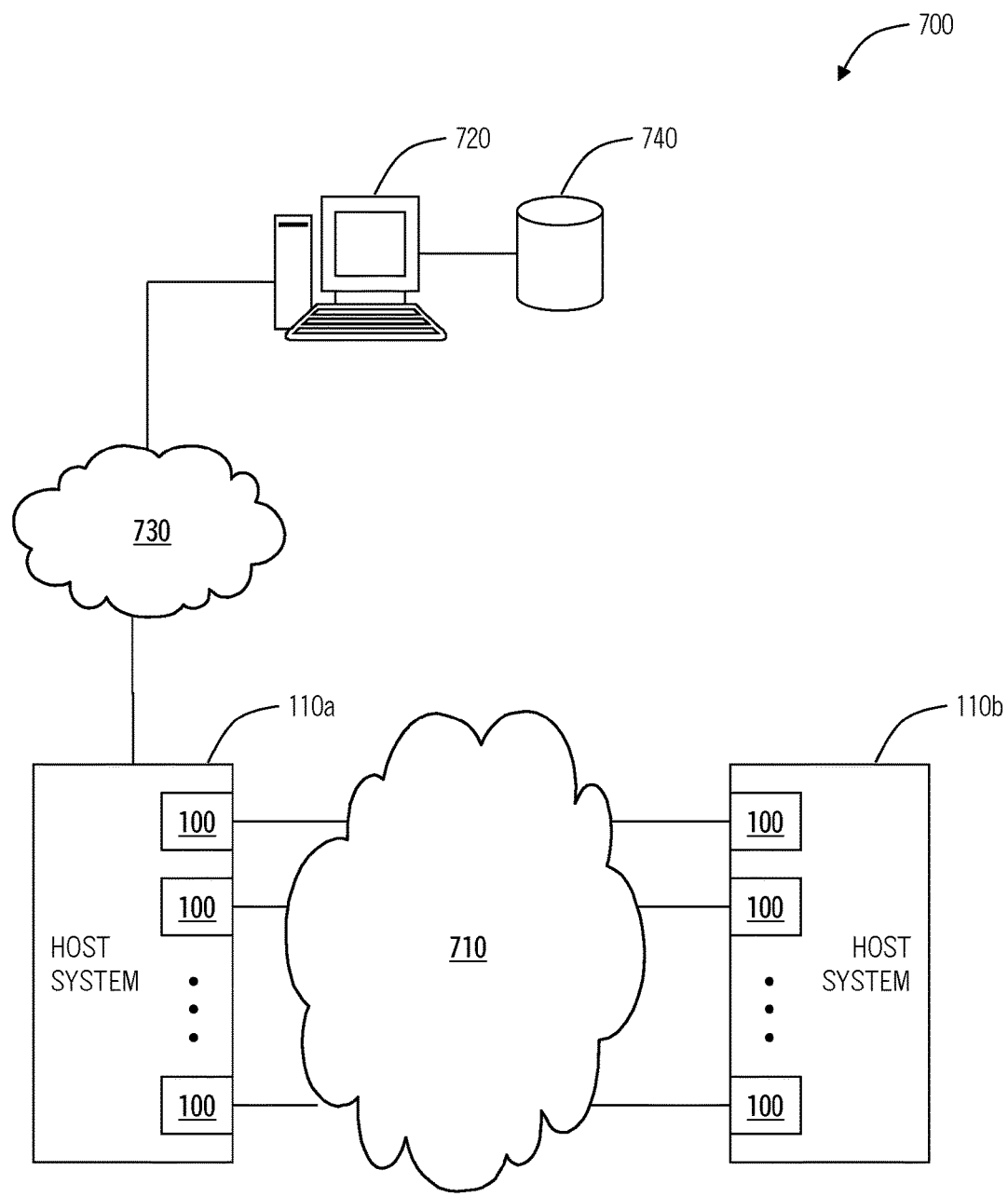
FIG. 7 is a network diagram of a network with two host devices including multiple optical transceivers.

Referring to FIG. 7, in an exemplary embodiment, a network diagram illustrates a network 700 with two host devices 110a, 110b including multiple optical transceivers 100. Each host device 110a, 110b includes multiple optical transceivers 100 connected to one another over an optical network 710. For example, the optical network 710 can include optical fibers, DWDM filters, amplifiers, regenerators, and the like. In this exemplary embodiment, the host device 110a is configured through software to access data, overhead, PMs, and alarms associated with each optical transceiver 100. Local optical transceivers 100 to the host device 110a are accessed through an MDIO or I2C interface. The host device 110a is communicatively coupled to an element management system/network management system (EMS/NMS) 720 through a data communications network (DCN) 730.

The EMS/NMS 720 is generally configured to control all OAM&P aspects of the host devices 110a, 110b. The EMS/NMS 720 operates on a server and may include a connection to a data store 740 to store PM, alarm, and other related information associated with the host devices 110a, 110b. The EMS/NMS 720 is configured to allow a network operator to access the data, overhead, PMs, and alarms on the optical transceivers 100. For example, the EMS/NMS 720 can include software modules to control all aspects of OAM&P associated with each optical transceiver 100, and store PMs, alarms, etc. in the data store 740. In an exemplary embodiment, the data communicated between the optical transceiver 100 and the host device 110a can be based on SFF-8472.

Additionally, the G.709 framing, FEC, and OAM&P can be user-provisionable allowing the optical transceiver 100 to operate with or without these functions. For example, the optical transceiver 100 can be set to provide framing and FEC, but not to provide OAM&P. This may be utilized in an application where neither host device 110a is configured to communicate to the optical transceiver 100 to retrieve the alarms and PMs. However, the optical transceivers 100 can still operate providing additional link budget and performance through the framing and FEC. Alternatively, FEC can be disabled with just framing and OAM&P enabled. Further, the optical transceivers 110 are capable of being monitored by industry-compliant network management systems (NMS) through the I2C or MDIO.

Figure 8:
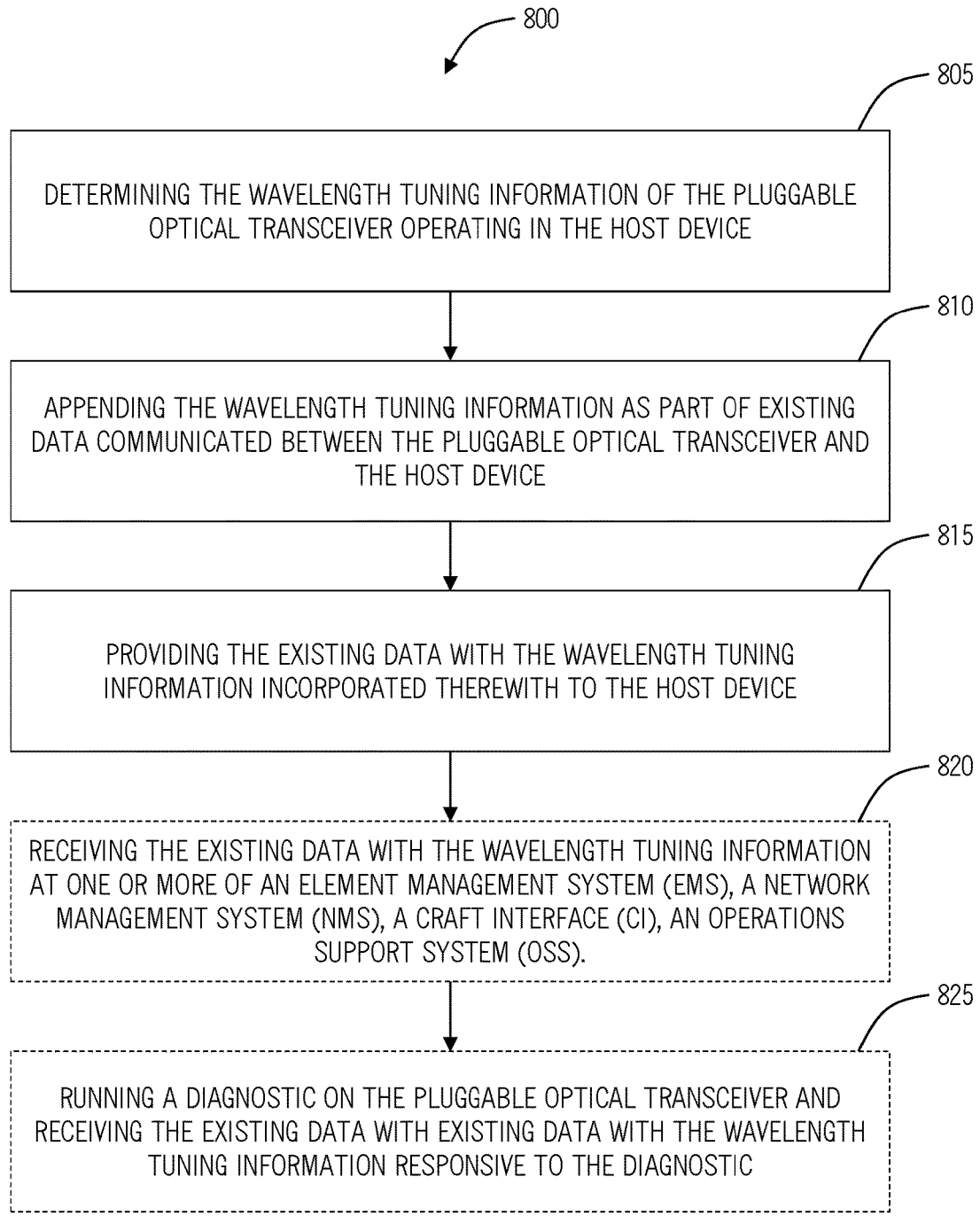
FIG. 8 is a flowchart of a process for conveying wavelength tuning information from a pluggable optical transceiver to a host device.

Referring to FIG. 8, in an exemplary embodiment, a flowchart illustrates a process 800 for conveying wavelength tuning information from a pluggable optical transceiver to a host device. The process 800 contemplates implementation via the pluggable optical transceiver 100 when installed in the host device 110. The process 800 includes determining the wavelength tuning information of the pluggable optical transceiver operating in the host device (step 805); appending the wavelength tuning information as part of existing data communicated between the pluggable optical transceiver and the host device (step 810); and providing the existing data with the wavelength tuning information incorporated therewith to the host device (step 815). The process 800 can further include receiving the existing data with the wavelength tuning information at one or more of an Element Management System (EMS), a Network Management System (NMS), a Craft Interface (CI), an Operations Support System (OSS) (step 820). The process 800 can further include running a diagnostic on the pluggable optical transceiver and receiving the existing data with existing data with the wavelength tuning information responsive to the diagnostic (step 825).

The host device may not natively support communication of the wavelength tuning information from the pluggable optical transceiver. The pluggable optical transceiver can be compliant to a Multi-Service Agreement (MSA); the host device is adapted to support the MSA, and the MSA may not natively support communication of the wavelength tuning information. The host device can include one of a switch and a router which one of i) has no notion of wavelength tuning on the pluggable optical transceiver and ii) operates a software release which does not support receiving the wavelength tuning information. The pluggable optical transceiver can be tunable across a wavelength spectrum, and the pluggable optical transceiver is one of SFP, SFP+, XFP, and XENPAK. The determining can include converting a channel identifier to a wavelength, based on a starting frequency and channel spacing, and the appending can include adding the wavelength as ASCII string added in front of or behind the existing data.

The appending can include adding a wavelength for the wavelength tuning information as an ASCII string added in front of or behind the existing data, wherein the ASCII string includes four characters representing an integer part of the wavelength, one character representing a decimal point, and two characters representing a fraction part of the wavelength, wherein the wavelength is expressed as XXXX.YY where XXXX are the four characters and YY are the two characters. The appending can include adding a wavelength for the wavelength tuning information as an ASCII string added in front of or behind a vendor part number in a vendor part number field already specified for communication between the pluggable optical transceiver and the host device.

In another exemplary embodiment, the pluggable optical transceiver 100 is adapted to convey wavelength tuning information to the host device 110. The pluggable optical transceiver 100 includes a transmitter 312, 362, 404, 530 adapted for wavelength tuning to a wavelength and a receiver 314, 364, 406, 530; a communication interface 316, 370, 412, 560 communicatively coupled to the host device 110; and processing circuitry 318, 540 adapted to i) determine the wavelength tuning information based on the wavelength while operation in the host device 110, ii) append the wavelength tuning information as part of existing data provided via the communication interface 316, 370, 412, 560, and iii) provide the existing data with the wavelength tuning information incorporated therewith via the communication interface 316, 370, 412, 560. One or more of an Element Management System (EMS), a Network Management System (NMS), a Craft Interface (CI), an Operations Support System (OSS) is adapted to receive the existing data with the wavelength tuning information, responsive to running a diagnostic on the pluggable optical transceiver.

The host device 110 may not natively support communication of the wavelength tuning information from the pluggable optical transceiver 100. The pluggable optical transceiver 100 is compliant to a Multi-Service Agreement (MSA), the host device 110 is adapted to support the MSA, and the MSA does not natively support communication of the wavelength tuning information. The host device 110 can include one of a switch and a router which one of i) has no notion of wavelength tuning on the pluggable optical transceiver 100 and ii) operates a software release which does not support receiving the wavelength tuning information. The pluggable optical transceiver 100 can be tunable across a wavelength spectrum, and the pluggable optical transceiver 100 can be one of SFP, SFP+, XFP, and XENPAK. The determined wavelength can be based on converting a channel identifier to a wavelength, based on a starting frequency and channel spacing, and the wavelength for the wavelength tuning information can be appended as ASCII string added in front of or behind the existing data.

A wavelength for the wavelength tuning information can be appended as an ASCII string added in front of or behind the existing data, wherein the ASCII string includes four characters representing an integer part of the wavelength, one character representing a decimal point, and two characters representing a fraction part of the wavelength, wherein the wavelength is expressed as XXXX.YY where XXXX are the four characters and YY are the two characters. A wavelength for the wavelength tuning information can be appended as an ASCII string added in front of or behind a vendor part number in a vendor part number field already specified for communication between the pluggable optical transceiver and the host device.

In a further exemplary embodiment, a host device 110 is adapted to operate a pluggable optical transceiver 100 and to receive wavelength tuning information therefrom. The host device 110 includes one or more interfaces adapted to receive the pluggable optical transceiver 100, and a communication interface communicatively coupled to the pluggable optical transceiver when installed in the one or more interfaces; wherein the host device does not support diagnostics over the communication interface for the wavelength tuning information, and wherein the wavelength tuning information is communicated to the host device via the communication interface appended to existing data already provided over the communication interface.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for conveying wavelength tuning information from a pluggable optical transceiver to a host device, the method comprising:
   determining the wavelength tuning information of the pluggable optical transceiver operating in the host device;
   appending the wavelength tuning information as part of existing data communicated between the pluggable optical transceiver and the host device; and
   providing the existing data with the wavelength tuning information incorporated therewith to the host device.

2. The method of claim 1, further comprising:
   receiving the existing data with the wavelength tuning information at one or more of an Element Management System (EMS), a Network Management System (NMS), a Craft Interface (CI), an Operations Support System (OSS).

3. The method of claim 1, further comprising:
   running a diagnostic on the pluggable optical transceiver and receiving the existing data with existing data with the wavelength tuning information responsive to the diagnostic.

4. The method of claim 1, wherein the host device does not natively support communication of the wavelength tuning information from the pluggable optical transceiver.

5. The method of claim 1, wherein the pluggable optical transceiver is compliant to a Multi-Service Agreement (MSA), wherein the host device is adapted to support the MSA, and wherein the MSA does not natively support communication of the wavelength tuning information.

6. The method of claim 1, wherein the host device comprises one of a switch and a router which one of i) has no notion of wavelength tuning on the pluggable optical transceiver and ii) operates a software release which does not support receiving the wavelength tuning information.

7. The method of claim 1, wherein the pluggable optical transceiver is tunable across a wavelength spectrum, and wherein the pluggable optical transceiver is one of SFP, SFP+, XFP, and XENPAK.

8. The method of claim 1, wherein the determining comprises converting a channel identifier to a wavelength, based on a starting frequency and channel spacing, and
   wherein the appending comprises adding the wavelength as ASCII string added in front of or behind the existing data.

9. The method of claim 1, wherein the appending comprises adding a wavelength for the wavelength tuning information as an ASCII string added in front of or behind the existing data, wherein the ASCII string comprises four characters representing an integer part of the wavelength, one character representing a decimal point, and two characters representing a fraction part of the wavelength, wherein the wavelength is expressed as XXXX.YY where XXXX are the four characters and YY are the two characters.

10. The method of claim 1, wherein the appending comprises adding a wavelength for the wavelength tuning information as an ASCII string added in front of or behind a vendor part number in a vendor part number field already specified for communication between the pluggable optical transceiver and the host device.

11. A pluggable optical transceiver adapted to convey wavelength tuning information to a host device, the pluggable optical transceiver comprising:
   a transmitter adapted for wavelength tuning to a wavelength and a receiver;
   a communication interface communicatively coupled to the host device; and
   processing circuitry adapted to i) determine the wavelength tuning information based on the wavelength while operation in the host device, ii) append the wavelength tuning information as part of existing data provided via the communication interface, and iii) provide the existing data with the wavelength tuning information incorporated therewith via the communication interface.

12. The pluggable optical transceiver of claim 11, wherein one or more of an Element Management System (EMS), a Network Management System (NMS), a Craft Interface (CI), an Operations Support System (OSS) is adapted to receive the existing data with the wavelength tuning information, responsive to running a diagnostic on the pluggable optical transceiver.

13. The pluggable optical transceiver of claim 11, wherein the host device does not natively support communication of the wavelength tuning information from the pluggable optical transceiver.

14. The pluggable optical transceiver of claim 11, wherein the pluggable optical transceiver is compliant to a Multi-Service Agreement (MSA), wherein the host device is adapted to support the MSA, and wherein the MSA does not natively support communication of the wavelength tuning information.

15. The pluggable optical transceiver of claim 11, wherein the host device comprises one of a switch and a router which one of i) has no notion of wavelength tuning on the pluggable optical transceiver and ii) operates a software release which does not support receiving the wavelength tuning information.

16. The pluggable optical transceiver of claim 11, wherein the pluggable optical transceiver is tunable across a wavelength spectrum, and wherein the pluggable optical transceiver is one of SFP, SFP+, XFP, and XENPAK.

17. The pluggable optical transceiver of claim 11, wherein the determined wavelength is based on converting a channel identifier to a wavelength, based on a starting frequency and channel spacing, and
   wherein the wavelength for the wavelength tuning information is appended as ASCII string added in front of or behind the existing data.

18. The pluggable optical transceiver of claim 11, wherein a wavelength for the wavelength tuning information is appended as an ASCII string added in front of or behind the existing data, wherein the ASCII string comprises four characters representing an integer part of the wavelength, one character representing a decimal point, and two characters representing a fraction part of the wavelength, wherein the wavelength is expressed as XXXX.YY where XXXX are the four characters and YY are the two characters.

19. The pluggable optical transceiver of claim 11, wherein a wavelength for the wavelength tuning information is appended as an ASCII string added in front of or behind a vendor part number in a vendor part number field already specified for communication between the pluggable optical transceiver and the host device.

20. A host device adapted to operate a pluggable optical transceiver and to receive wavelength tuning information therefrom, the host device comprising:
- one or more interfaces adapted to receive the pluggable optical transceiver; and
- a communication interface communicatively coupled to the pluggable optical transceiver when installed in the one or more interfaces;
- wherein the host device does not support diagnostics over the communication interface for the wavelength tuning information, and wherein the wavelength tuning information is communicated to the host device via the communication interface appended to existing data already provided over the communication interface.

* * * * *